(12) United States Patent
Strehlau et al.

(10) Patent No.: US 6,338,831 B1
(45) Date of Patent: Jan. 15, 2002

(54) STORAGE MATERIAL FOR SULFUR OXIDES

(75) Inventors: Wolfgang Strehlau, Grosskrotzenburg; Ulrich Göbel, Hattersheim; Rainer Domesle, Alzenau; Egbert Lox, Hanau; Thomas Kreuzer, Karben, all of (DE)

(73) Assignee: Degussa AG, Hanau (DE)

( * ) Notice: Subject to any disclaimer, the term of this patent is extended or adjusted under 35 U.S.C. 154(b) by 0 days.

(21) Appl. No.: 09/276,903

(22) Filed: Mar. 26, 1999

(30) Foreign Application Priority Data

Mar. 27, 1998 (DE) .......................... 198 13 655

(51) Int. Cl.[7] .......................... B01D 53/50; B01D 53/34
(52) U.S. Cl. .............. 423/244.07; 423/212; 423/213.2; 423/213.5; 423/244.01; 423/244.09; 423/244.1
(58) Field of Search .................. 502/304, 325, 502/339, 340, 341, 355, 414, 415, 524; 423/212, 244.01, 244.07, 244.09, 244.1, 213.2, 213.5

(56) References Cited

U.S. PATENT DOCUMENTS

| | | | |
|---|---|---|---|
| 4,239,656 A | * 12/1980 | Fujitani et al. | 252/462 |
| 4,274,981 A | * 6/1981 | Suzuki et al. | 252/438 |
| 4,469,589 A | * 9/1984 | Yoo et al. | 208/120 |
| 4,883,783 A | 11/1989 | Burk, Jr. et al. | 502/304 |
| 5,547,648 A | 8/1996 | Buchanan | 423/210 |
| 5,728,358 A | * 3/1998 | Avidan et al. | 423/244.01 |
| 6,145,303 A | * 11/2000 | Strehlau et al. | |

FOREIGN PATENT DOCUMENTS

| | | | |
|---|---|---|---|
| EP | 0 110 702 | * | 6/1984 |
| EP | 0582917 | | 2/1994 |
| EP | 0625633 | | 6/1994 |
| EP | 0560991 | | 7/1997 |
| WO | WO 91/10505 | | 7/1991 |
| WO | 96/05140 | | 2/1996 |
| WO | WO 97/48480 | | 12/1997 |

OTHER PUBLICATIONS

Corma et al., "Optimization of SOx additives of FCC catalysts based on MgO–Al2O3 mixed oxides produced from hydrotalcites". Applied Catalysis B: Environmental vol. 4, pp 29–43 (1994).*

Chemical Abstracts, Abstract No. 121:112942 to A. Corma, et al., dated 1994.

* cited by examiner

Primary Examiner—Steven P. Griffin
Assistant Examiner—Christina Ildebrando
(74) Attorney, Agent, or Firm—Smith, Gambrell & Russell, LLP (57) ABSTRACT

A sulfur oxide storage material contains a magnesium-aluminum spinel ($MgO \cdot Al_2O_3$) and can be used as a so-called "sulfur trap" to remove sulfur oxides from oxygen-containing exhaust gases of industrial processes. In particular, it can be used for the catalytic purification of exhaust gas from internal-combustion engines to remove the sulfur oxides from the exhaust gas in order to protect the exhaust gas catalysts from sulfur poisoning. The material displays a molar ratio of magnesium oxide to aluminum oxide in the range of over 1.1:1, and the magnesium oxide present in stoichiometric excess is homogeneously distributed in a highly disperse form in the storage material.

17 Claims, 6 Drawing Sheets

Figur 8

Figur 9

STORAGE MATERIAL FOR SULFUR OXIDES

INTRODUCTION AND BACKGROUND

The present invention relates to a storage material for sulfur oxides that contains a magnesium-aluminate spinel (MgO.Al$_2$O$_3$) and can be used as a so-called "sulfur trap" to remove sulfur oxides from oxygen-containing exhaust gases of industrial processes. In particular, it can be used for the catalytic exhaust gas purification of internal-combustion engines to remove the sulfur oxides from the exhaust gas in order to protect the exhaust gas catalysts from sulfur poisoning.

The principal harmful substances contained in the exhaust gas from internal-combustion engines are carbon monoxide (CO), uncombusted hydrocarbons (HC), and nitrogen oxides (NO$_x$). In addition, the exhaust gas contains small amounts of hydrogen (H$_2$) as well as sulfur oxides (SO$_x$) that originate from the sulfur content of the fuel and the lubricating oils of the engine. Using modern exhaust gas catalysts, a high percentage of the harmful substances, with the exception of the sulfur oxides, in stoichiometric operation of an internal-combustion engine, can be reacted into the innocuous components water, carbon dioxide and nitrogen. Catalysts developed for the exhaust gas purification of stoichiometrically-operated internal-combustion engines are termed "three-way catalysts."

Modern internal-combustion engines are increasingly operated with lean air/fuel mixtures to save fuel. While the purification of the exhaust gases of stoichiometrically-operated internal-combustion engines has reached a very high level, the purification of the exhaust gases of lean-burning internal-combustion engines still constitutes a great problem. For the major duration of their operation, these internal-combustion engines work with normalized air/fuel ratios greater than 1.3. Their exhaust gas contains about 3 to 15% by vol of oxygen. The normalized air/fuel ratio $\lambda$ designates the air/fuel ratio standardized to stoichiometric conditions.

Heavily oxidizing conditions are consequently present in the exhaust gas of lean-burning internal-combustion engines. Under these conditions, the nitric oxides in the exhaust gas can no longer be converted to innocuous nitrogen in a simple manner.

To solve this problem, so-called "nitric oxide storage catalysts" have inter alia been developed that oxidize the nitric oxides under lean exhaust gas conditions into nitrogen dioxide and store this in the form of nitrates. After the storage capacity of the catalyst has been reached, it is regenerated. This occurs by enriching the exhaust gas and optionally by raising the exhaust gas temperature. This decomposes the stored nitrates and releases them into the exhaust gas stream as nitrogen oxides. The released nitrogen oxides are then reduced to nitrogen at the storage catalyst with oxidation of the reductive components (hydrocarbons, carbon monoxide and hydrogen) contained in the rich exhaust gas. The storage catalyst hereby regains its original storage capacity. A storage cycle of this type lasts about 60 to 100 seconds, about 0.5 to 20 seconds being needed for the regeneration.

The mode of operation and composition of nitrogen oxides storage catalysts are known, for example, from EP 0 560 991 B1. As storage material, these catalysts contain at least one component from the group of alkali metals (potassium, sodium, lithium, cesium), the alkaline earth metals (barium, calcium) or the rare earth metals (lanthanum, yttrium). The storage catalyst contains platinum as a catalytically active element. The task of the catalytically active components is, on the one hand, to oxidize the nitrogen oxides in the exhaust gas to nitrogen dioxide under lean conditions and to reduce the released nitrogen oxides to nitrogen under rich exhaust gas conditions.

A major obstacle to the use of nitrogen oxides storage catalysts is the amount of sulfur oxides contained in the exhaust gas, since these are also oxidized at the storage catalyst under lean exhaust gas conditions and react with the storage components to form thermally very stable sulfates that cannot be destroyed during the normal regeneration of the storage catalyst. The storage capacity of the storage catalyst is thus reduced with increasing duration of operation since the storage components are blocked by sulfates.

The storage of nitrogen oxides and sulfur oxides on a storage catalyst displays pronounced temperature dependence. Storage and release of the nitrogen oxides only occur in a narrowly limited temperature interval (temperature window) that lies, for example, between about 200 and 500° C. in the case of the frequently used alkaline earth metal oxides. The lower temperature limit is kinetically determined, whereas the upper limit temperature is given by the thermal stability of the nitrates formed. The sulfates of the alkaline earth metal oxides are only decomposed at still higher temperatures under reducing exhaust gas conditions.

To prevent the storage catalyst from being poisoned by sulfates, EP 0 582 917 A1 proposes to reduce the poisoning of the storage catalyst with sulfur by means of a sulfur trap inserted in the exhaust gas stream upstream of the storage catalyst. Alkaline metals (potassium, sodium, lithium and cesium), alkaline earth metals (barium and calcium) and rare earth metals (lanthanum, yttrium) are proposed as storage materials for the sulfur trap. Here, the sulfur trap additionally comprises platinum as catalytically active component.

It is, however, a disadvantage of the proposal of EP 0 582 917 A1 that no desulfurizing of the sulfur trap is provided. In other words, after the storage capacity of the sulfur trap has been reached, the sulfur oxides contained in the exhaust gas pass through the sulfur trap unhindered and can poison the downstream nitrogen oxide storage catalyst.

EP 0 625 633 A1 provides an improvement to this concept. According to this document, a sulfur trap is also disposed in the exhaust gas stream of the internal-combustion engine upstream of the nitrogen oxides storage catalyst. This combination of sulfur trap and nitrogen oxides storage catalyst is operated in such a manner that, under lean exhaust gas conditions, sulfur oxides are stored on the sulfur trap and the nitrogen oxides on the nitrogen oxides storage catalyst. Periodic modification of the exhaust gas conditions from lean to rich decomposes the sulfates stored on the sulfur trap to sulfur dioxide and the nitrates stored on the nitrogen oxides storage catalyst to nitrogen dioxide. Herein, however, there is a danger of sulfur dioxide and nitrogen dioxide reacting together over the nitrogen oxides storage catalyst to form sulfur trioxide and nitrogen monoxide and of sulfur trioxide being stored on the nitrogen oxides storage catalyst in the form of sulfates.

As an alternative hereto, it is possible to provide for the exhaust gas temperature to be raised in order to desulfurize the sulfur trap to values that lie above the limit temperature of the storage catalyst for the storage of the nitrogen oxides. This ensures that no stored nitrogen oxides remain on the storage catalyst during the desulfurizing of the sulfur trap. In this case the above-described reaction of sulfur dioxide with the nitrogen oxides cannot occur. This does require, however, that the sulfur oxides are only released from the sulfur trap above a specific exhaust gas temperature that, taking a possible temperature difference between the sulfur trap and the storage catalyst into account, lies above the upper limit temperature of the storage catalyst.

The requirements to be fulfilled by the storage materials for the sulfur trap during application in the processes described demand a high storage capacity, a temperature $T_{S,DeSOx}$ (desulfurizing temperature) for the commencement of desulfurizing that can be adapted by specific measures to the needs of the nitrogen oxides storage catalyst and the temperature conditions in the exhaust gas installation, as well as a highest possible decomposition rate for the sulfates above the desulfurizing temperature $T_{S,DeSOx}$.

It is an object of the present invention to provide a storage material for sulfur oxides that substantially fulfills the requirements described above.

SUMMARY OF THE INVENTION

The above and other objects of the invention can be achieved by a storage material for sulfur oxides that contains a magnesium-aluminate spinel ($MgO.Al_2O_3$). The material is characterized in that it displays a molar ratio of magnesium oxide to aluminum oxide of over 1.1:1 and that the magnesium oxide present in stoichiometric excess is homogeneously distributed in the storage material in a highly disperse form.

U.S. Pat. No. 4,883,783 discloses the use of Mg/Al spinel to reduce sulfur dioxide emissions of catalytic cracking installations. According to this printed patent specification, the Mg/Al spinel is advantageously prepared synthetically by reacting a water-soluble, inorganic magnesium salt with a water-soluble aluminate salt. Magnesium and aluminate salt are dissolved in an aqueous medium. This causes a spinel precursor to precipitate out by neutralization of the aluminate by the acid magnesium salt. In so doing, care must be taken to ensure that the acid magnesium salt or the aluminate are not applied in excess, to prevent precipitation of excess magnesium oxide or aluminum oxide. According to the patent specification, the Mg/Al spinel still contains small amounts of at least one alkaline metal component, one calcium component, one barium component, one strontium component and one beryllium component. The material may also contain one rare earth metal component.

Contrary to the teaching of this patent specification, the storage material of the invention contains magnesium oxide in stoichiometric excess. The excess magnesium oxide is homogeneously distributed in the Mg/Al spinel and stabilizes its specific surface also when high temperatures are applied. For this purpose, a molar ratio of magnesium oxide to aluminum oxide of at least 1.1:1 is required. Molar ratios of 2:1 to 10:1 are advantageously used, in particular from 2:1 to 6:1.

The sulfur oxides are stored on the storage material of the invention substantially by reaction with the excess magnesium oxide in the form of magnesium sulfate. The Mg/Al spinel supporting structure contributes to the storage capacity to a minor extent. The storage material of the invention displays a good aging resistance, this being attributed to the fact that the sulfur oxides advantageously react with the highly dispersed magnesium oxide. This protects the high surface area support structure of the material from destruction through reaction with the sulfur oxides of the exhaust gas.

To store the sulfur oxides, these first have to be oxidized to sulfur trioxide. This can occur by means of an upstream oxidation catalyst. Advantageously, however, the storage material is itself provided with catalytically active components for the oxidation of sulfur dioxide to sulfur trioxide. Suitable for this purpose are the platinum group metals platinum, palladium and rhodium, in particular platinum that can be introduced into the material through impregnation with a soluble precursor compound. The platinum (group metals are introduced into the storage material in a concentration of up to 5% by weight, related to the total weight of the storage material.

The sulfates stored on the storage material are decomposed by lowering the normalized air/fuel ratio of the exhaust gas below 1 (enriching of the exhaust gas) and raising the exhaust gas temperature to values above about 500° C. and desorbed in the form of sulfur oxides. This "desulfurizing" restores the original storage capacity of the material.

In a preferred embodiment, the storage material is also doped with at least one of the alkaline earth metal oxides calcium oxide, strontium oxide and barium oxide in an amount from 1 to 40% by weight related to the total weight of the material. This doping call shift the temperature for the commencement of desulfurizing toward higher values. This possibility is of special importance for the combination of the sulfur trap with a downstream nitrogen oxides storage catalyst.

In addition, the storage material can contain one or several rare earth oxides, in particular cerium oxide and lanthanum oxide, that support the decomposition of the sulfates formed under rich exhaust gas conditions and at elevated temperatures. The addition of the rare earth oxides to the storage material can be 1 to 40% by weight related to the total weight of the material. Cerium oxide in combination with aluminum oxide is an unsuitable storage material for sulfur oxides (see Comparative Example 3). In combination with the storage material of the invention, it does, however, have a positive effect on the kinetics of desulfurization.

The material of the invention displays a specific surface area (measured according to DIN 66132) between 100 and 300 $m^2/g$. Under high temperatures, this surface area decreases, but it is, however, still at least 20 $m^2/g$ after calcination at 1050° C. for the duration of 24 hours.

The storage material of the invention is advantageously prepared by calcination of a magnesium/aluminum hydrotalcite (Mg/Al hydrotalcite). Mg/Al hydrotalcite is a twin-layered hydroxide of magnesium oxide and aluminum oxide. Its stoichiometric composition has the formula $6MgO.Al_2O_3.CO_2.12H_2O$. The molar ratio of magnesium oxide to aluminum oxide is thus 6. Materials with molar ratios of 1 to 6 are commercially available. The preparation of synthetic Mg/Al hydrotalcite is, for example, described in WO 96/05140.

To convert the Mg/Al hydrotalcite into a storage material for sulfur oxides, it is calcinated at a temperature of 400 to 600° C. for the duration of 1 to 10, advantageously 4 hours. The Mg/Al hydrotalcite used as starting material here displays the molar ratio of magnesium oxide to aluminum oxide needed for the finished storage material. Calcination transforms the hydrotalcite into stoichiometrically composed spinel ($MgO.Al_2O_3$), the magnesium oxide present in stoichiometric excess being present in ultra-fine distribution in the storage material so formed.

Calcination of the Mg/Al hydrotalcite prior to use as storage material is not absolutely essential, since the conversion of the hydrotalcite into spinel can also occur during use, for example through the hot exhaust gases of the internal-combustion engines. For a reproducible manufacture, calcination of the hydrotalcite is, however, advisable prior to use as storage material for sulfur oxides.

Before or after the calcination, the doping elements, optionally the rare earth oxides and the catalytically active components, are introduced into the storage material by impregnation with soluble precursor compounds. The material is then recalcinated for the thermal decomposition of the precursor compounds. The introduction of the additional substances into the storage material can either be carried out at the same time or successively in any order. The rare earth oxides can also be mixed with the storage material as solid substances.

There are many possibilities for using the storage material of the invention in industrial processes, such as, for example, in the fluid catalytic cracking process (FCC) and in the exhaust gas purification of motor vehicles. In the latter case, it can, as already stated, be used as a separate sulfur trap or be worked directly into the nitrogen oxides storage catalyst to be protected from poisoning by sulfur. The latter embodiment leads to a pronounced increase in the sulfur resistance of the nitrogen oxides storage catalyst and can render the use of a separate sulfur trap superfluous.

If the storage material is used as a separate sulfur trap, it is either necessary to provide an upstream oxidation catalyst to oxidize the sulfur oxides of the exhaust gas to sulfur trioxide, or the storage material itself must be provided with catalytically active components to oxidize the sulfur oxides. In this case, if the sulfur trap is disposed close behind the internal-combustion engine, it simultaneously fulfills the function of a pre-catalyst.

The storage material is advantageously used to prepare sulfur traps for purifying the exhaust gases of lean-burning internal-combustion engines. For this purpose, it is applied alone or mixed with other materials in the form of a coating on monolithic carrier bodies. These carrier bodies can be honeycomb bodies made of ceramic or metal, open-pore ceramic foams or any other gas-permeable carrier structures. The concentration of the storage material on these carrier bodies advantageously lies in the range between 50 and 200 grams per liter volume of the carrier body.

The materials that may be used in the mixture with the storage material can be high-surface area materials that are conventionally used as carrier materials for the catalytically active precious metals in the preparation of motor vehicle exhaust gas catalysts. Materials with a specific surface area of more than 10 $m^2/g$ are conventionally referred to as having a high, surface area. Suitable materials of this kind are active aluminum oxide, titanium oxide, zirconium oxide, silicon dioxide, mixed oxides hereof zeolites or physical mixtures of these oxides. The storage material here can be in a weight ratio of 1:5 to 20:1 to the additional substances.

The catalytically active components (platinum, palladium, rhodium, ruthenium, iridium osmium) are introduced into the sulfur trap by impregnation. The sulfur trap can further be provided with promoters from the group of the transition metal oxides. Suitable transition metals that support the catalytic function of the sulfur trap are zinc, nickel, chromium, cobalt, copper and silver.

Thus, the storage material can be used in sulfur traps in combination with several other components. A preferred sulfur trap includes, for example, a mixture of aluminum oxide and the material of the invention. In addition, it is also possible to dope the storage material with alkaline earth elements. In principle, these additional components of the sulfur trap are also able to bind sulfur trioxide in the form of sulfates.

If, for example, aluminum oxide is used as the sole material, the sulfur components are bound in the form of aluminum sulfate. However, this greatly reduces the specific surface area of the aluminum oxide. As a consequence hereof, the rate of formation of aluminum sulfate diminishes with increasing aging of the sulfur trap. By mixing the aluminum oxide with the storage material of the invention, this aging process can be largely avoided, since in this case the more stable magnesium sulfate is advantageously formed.

In the following examples and comparative examples, various formulations of sulfur traps with and without use of the storage material of the invention are compared with one another. To ensure the comparability of the various formulations, the amounts of the individual components were in each case adjusted in such a way that the theoretical total storage capacity of the sulfur traps was about 4.7 mol sulfate in all the examples. In this context, it was assumed that aluminum oxide can be completely converted into aluminum sulfate and magnesium oxide completely into magnesium sulfate. This approach was also adopted in the case of the doping elements. In each case, the amount of the doping elements was adjusted so that their theoretical storage capacity was 0.17 mol sulfur per liter of the sulfur traps. The storage capacity of the spinel was calculated as the sum of the storage capacities of the ratios of magnesium oxide and aluminum oxide contained therein.

Platinum was used as the precious metal component in all the sulfur traps.

BRIEF DESCRIPTION OF THE DRAWINGS

The present invention will be further understood with reference to the accompanying drawings, wherein.

DETAILED EMBODIMENTS OF THE INVENTION

EXAMPLE 1

Three differently composed Mg/Al hydrotalcites I, II and III were used to prepare the storage material of the invention. For conversion into the material of the invention, the hydrotalcites were calcined for the duration of 4 hours at 550° C.

Table 1 shows the molar ratios of these three materials and their specific surfaces according to DIN 66132 in their fresh state and after calcination for four hours at 550° C. (conversion into the storage material of the invention) and after calcination at 1050° C. for the duration of 24 hours.

After this calcination, the storage material still has a specific surface area of at least 20 m²/g.

TABLE 1

|  | Mg/Al hydrotalcite | | |
|---|---|---|---|
|  | I | II | III |
| Molar ratio MgO/Al$_2$O$_3$ | 5.7 | 2.6 | 1.3 |
| Specific surface area |  |  |  |
| fresh | 200 m²/g | 235 m²/g | 256 m²/g |
| 550° C. 4 h | 155 m²/g | 200 m²/g | 214 m²/g |
| 1050° C. 24 h | 56 m²/g | 37 m²/g | 26 m²/g |

EXAMPLE 2

An aqueous dispersion of γ-Al$_2$O$_3$ (specific surface area 140 m²/g, particle size d$_{50}$=4 μm) and Mg/Al hydrotalcite (particle size d$_{50}$=4 μm) was prepared with a weight ratio of Mg/Al hydrotalcite to γ-Al$_2$O$_3$ of 14:3. The Mg/Al hydrotalcite used had a molar ratio MgO/Al$_2$O$_3$ of 2.6. It was calcined in air in a pre-treatment at 550° C. for the duration of 4 hours and transferred thereby into the storage material of the invention. Thereafter, the material still had a specific surface area of 200 m²/g (hydrotalcite II of Example 1).

Several honeycomb bodies of cordierite with a cell density of 62 cm$^{-2}$ and a volume of 0.8 liters were coated by immersion in this dispersion with a total of 170 g dry mass per liter of honeycomb body volume (140 g/l hydrotalcite and 30 g/l γ-Al$_2$O$_3$). The coating was dried at 120° C. and calcined in air for 2 hours at 500° C. The coated honeycomb bodies were then impregnated by immersion in an aqueous solution of platinum tetraammine nitrate Pt(NH$_3$)$_4$(NO$_3$)$_2$, dried at 120° C. and calcined in air at 500° C. for 2 hours. The finished sulfur traps contained 2 g platinum per liter of honeycomb body.

EXAMPLE 3

A sulfur trap prepared in Example 2 was loaded with 10 g calcium oxide per liter volume of the sulfur trap by immersion in an aqueous solution of calcium nitrate, drying at 120° C. and calcining in air at 500° C.

EXAMPLE 4

Another sulfur trap prepared in Example 2 was loaded with 17.5 g strontium oxide per liter by immersion in an aqueous solution of strontium acetate, drying at 120° C. and calcining in air at 500° C.

EXAMPLE 5

Another sulfur trap prepared in Example 2 was loaded with 26.0 g barium oxide per liter by immersion in an aqueous solution of barium acetate, drying at 120° C. and calcining in air at 500° C.

EXAMPLE 6

Another sulfur trap prepared in Example 2 was loaded with 18.5 g lanthanum oxide per liter by immersion in an aqueous solution of lanthanum acetate, drying at 120° C. and calcination in air at 500° C.

EXAMPLE 7

100 g of γ-Al$_2$O$_3$ (specific surface area 140 m²/g) were loaded with 30 g of rhodium by impregnating with an aqueous solution of rhodium nitrate Rh(NO$_3$)$_3$, drying at 120° C. and calcining at 500° C. in air. The Rh/Al$_2$O$_3$ powder prepared in this way was stirred into water and milled to a particle size of 4 μm (d$_{50}$).

Another of the sulfur traps prepared in Example 2 was loaded with 30 g, of Rh/Al$_2$O$_3$ per liter of honeycomb structure by immersing in the dispersion of Rh/Al$_2$O$_3$. The sulfur trap obtained in this way was dried at 120° C. and calcined at 500° C. in air.

COMPARATIVE EXAMPLE 1

To prepare a conventional sulfur trap, an aqueous dispersion of γ-Al$_2$O$_3$ (specific surface area 140 m²/g, particle size d$_{50}$=4 μm) was prepared and another honeycomb body of cordierite coated by immersion in this dispersion with 160 g γ-Al$_2$O$_3$ per liter of honeycomb body volume The coating was dried at 120° C. and calcinated in air for 2 hours at 500° C.

The coating was impregnated with an aqueous solution of platinum tetraammine nitrate, dried again at 120° C. and calcined in air at 500° C. for the duration of 2 hours. The finished coating contained 2 g platinum per liter of the honeycomb body volume. Thereafter, the coating was impregnated by renewed immersion in an aqueous solution of iron (III) nitrate dried at 120° C. and calcined in air at 500° C. The calcined coating contained iron in an amount of 9.1 g per liter, calculated as iron (III) oxide.

COMPARATIVE EXAMPLE 2

Another conventional sulfur trap was prepared according to Comparative Example 1. As distinct from Comparative Example 1, the coating was not impregnated with iron nitrate but with manganese acetate. The finished sulfur trap contained manganese in an amount of 14.8 g per liter of honeycomb body volume, calculated as manganese (IV) oxide.

COMPARATIVE EXAMPLE 3

Another conventional sulfur trap was prepared according to Comparative Example 1. As distinct from Comparative Example 1, the coating was not impregnated with iron nitrate but with cerium nitrate. The finished sulfur trap contained cerium in an amount of 29.2 g per liter of honeycomb body volume, calculated as cerium (IV) oxide.

The composition of the sulfur traps prepared in the above examples is summarized in Table 2.

TABLE 2

| Composition of the Sulfur Traps | | | | | |
|---|---|---|---|---|---|
| Exam- | γ-Al$_2$O$_3$ | Hydrotalcite | Doping | | Platinum |
| ple | [g/l] | [g/l] | Material | [g/l] | [g/l] |
| E2 | 30 | 140 | — | — | 2 |
| E3 | 30 | 140 | CaO | 10 | 2 |
| E4 | 30 | 140 | SrO | 17.5 | 2 |
| E5 | 30 | 140 | BaO | 26 | 2 |
| E6 | 30 | 140 | La$_2$O$_3$ | 18.5 | 2 |
| E7 | 30 + 30 g Rh/Al$_2$O$_3$ | 140 | — | — | 2 + 0.9 g Rh |
| CE1 | 160 |  | Iron oxide | 9.1 | 2 |
| CE2 | 160 |  | Manganese oxide | 14.8 | 2 |
| CE3 | 160 |  | Cerium oxide | 19.5 | 2 |

TABLE 3

| Example | Emitted sulfur as SO$_2$ [g] | Released Sulfur in [g] as | | | SO$_2$/H$_2$S/COS Desorption [° C.] | |
|---|---|---|---|---|---|---|
| | | SO$_2$ [g] | H$_2$S [g] | COS [g] | T$_{s, DeSOx}$ | T$_{End}$ |
| E2 | 4.53 | 4.11 | 0.02 | unmeasurable | 475 | 675 |
| E3 | 4.49 | 3.93 | 0.03 | unmeasurable | 500 | 700 |
| E4 | 4.65 | 4.61 | 0.01 | unmeasurable | 520 | 730 |
| E5 | 4.43 | 4.32 | 0.01 | unmeasurable | 550 | 735 |
| CE1 | 4.46 | 1.33 | 0.03 | unmeasurable | 520 | 610 |
| CE2 | 4.61 | 2.47 | 0.02 | unmeasurable | 400 | 700 |
| CE3 | 4.55 | 4.41 | 0.01 | unmeasurable | 350 | 600 |

WORKING EXAMPLE 1

For the effective use of a sulfur trap in association with a nitrogen oxides storage catalyst, its storage capacity under lean exhaust gas conditions, the avoidance of secondary emissions on the release of the stored sulfur in the form of hydrogen sulfide H$_2$S and carbonyl sulfide COS, as well as the desulfurizing temperature TS$_{S,DeSOx}$ and the release rate for the sulfur oxides as a function of exhaust gas temperature and normalized air/fuel ratio of the exhaust gas are of importance.

The following investigations therefore were conducted to evaluate the sulfur traps according to Examples 2 to 6 and Comparative Examples 1 to 3.

The sulfur traps described in the examples were first charged with sulfur for 5 hours in a lean Otto engine (internal combustion) that was operated at a normalized air/fuel ratio of 1.5 using fuel with 400 wt. ppm sulfur content. The exhaust gas temperature upstream of the sulfur trap in this case was 400° C. In each case the sulfur traps used had a volume of 0.8 liters. The throughput of the exhaust gas was 42000 Nl/h.

First, the raw emissions from the engine of sulfur dioxide, hydrogen sulfide and carbonyl sulfide were determined using an ion molecule reaction mass spectrometer (IMR-MS). After incorporating the appropriate sulfur trap in the exhaust gas installation the time course of the emissions downstream of the sulfur trap was measured. These readings were used to calculate by integration over time both the amount of sulfur emitted by the engine and also the amounts of sulfur taken up by the sulfur traps. The sulfur traps were then slowly heated to 750° C. a normalized air/fuel ratio of 0.98. Using, the IMR-MS, the concentrations of sulfur dioxide, hydrogen sulfide and carbonyl sulfide given off by the sulfur traps in the exhaust gas stream during the heating up process were determined as a function of time and temperature. The results of the investigations are set out in Table 3, as well as in FIGS. 1 to 7.

The measurements show that during the lean-burning time, the sulfur traps of Examples 2 to 5 took up the amounts of sulfur emitted by the engine in an almost quantitative manner. During the desulfurizing in the rich exhaust gas the sulfur could be released again in a substantially quantitative manner. In contrast, Comparative Example 1 shows a markedly lower sulfur uptake. Here, too, however, the desulfurizing occurs in an almost quantitative manner. Comparative Example 2 shows a very broad desorption range for the sulfur that does not allow a rapid desulfurizing of the sulfur traps. Moreover, as in Comparative Example 3, the desulfurizing already begins at very low temperatures. This is therefore unable to prevent the sulfur release overlapping with the activity window of conventional storage catalysts.

The last two columns in Table 3 give the temperature of the exhaust gas at the beginning of the desulfurizing T$_{S,DeSOx}$ as well as the final temperature T$_{End}$ after completion of desulfurizing. The difference between the two should be as small as possible to ensure rapid desulfurizing of the sulfur traps. In Examples 1 to 4 of the invention, the temperature difference is 200, 210 and 185° C. In Comparative Examples 2 and 3, values of 300 and 250° C. were measured. The temperature difference in Comparative Example 1 is only 90° C.

Furthermore, the investigations show that the secondary emissions of hydrogen sulfide and carbonyl sulfide at the value for the normalized air/fuel ratio of 0.98 selected for the desulfurizing only constitute fractions of the sulfur dioxide emissions in all the examples and comparative examples.

The secondary emissions substantially depend on the normalized air/fuel ratio of the exhaust gas used for the desulfurizing. As the following investigations show, there are two preferred ranges for the normalized air/fuel ratio for the desulfurizing. The first range is close to the stoichiometric point between about 0.97 and 1.0, the second between 0.6 and 0.8.

Figure 1:
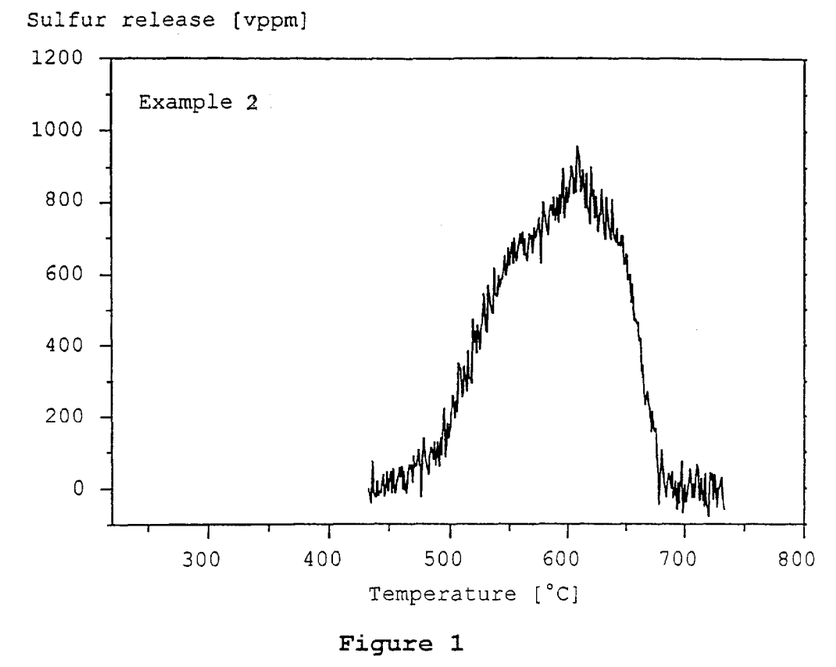
FIGS. 1–4 are plots of the desulfurization versus temperature of the sulfur traps of Examples 2 to 5.
Figure 2:
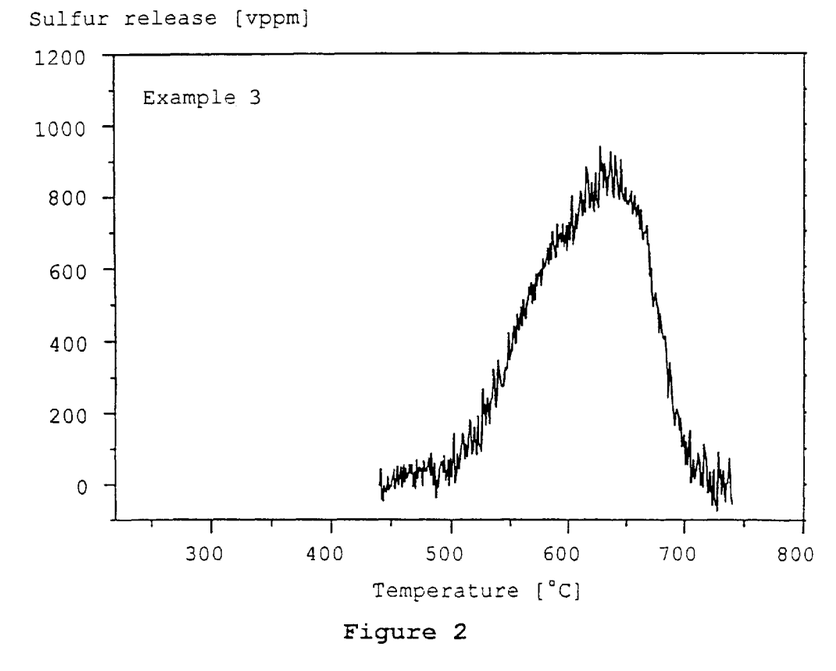
Figure 3:
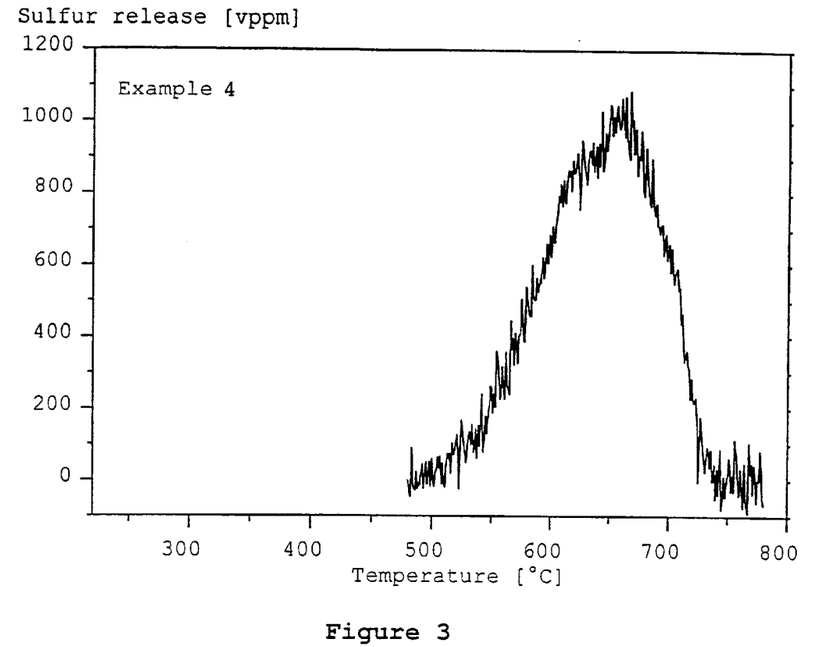
Figure 4:
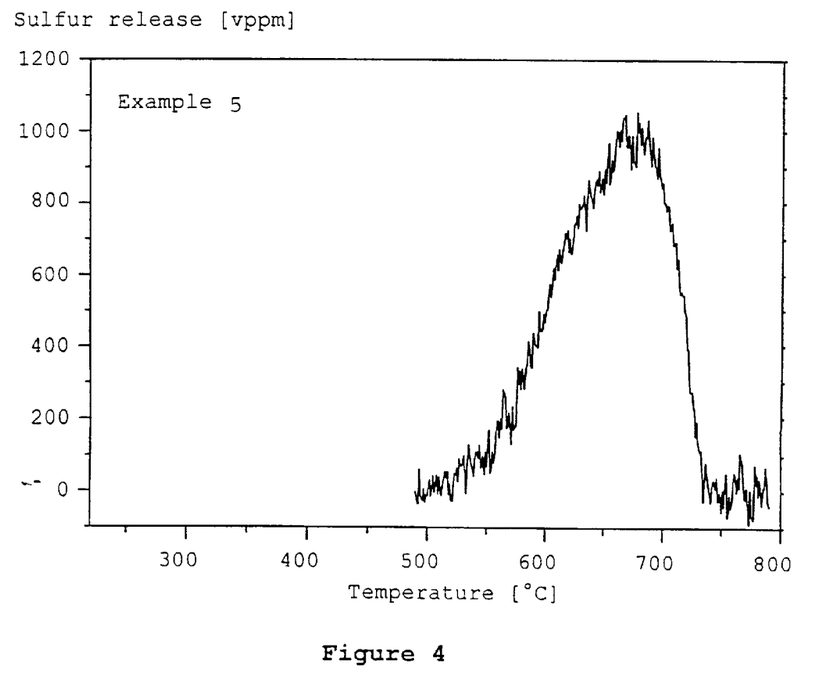
Figure 5:
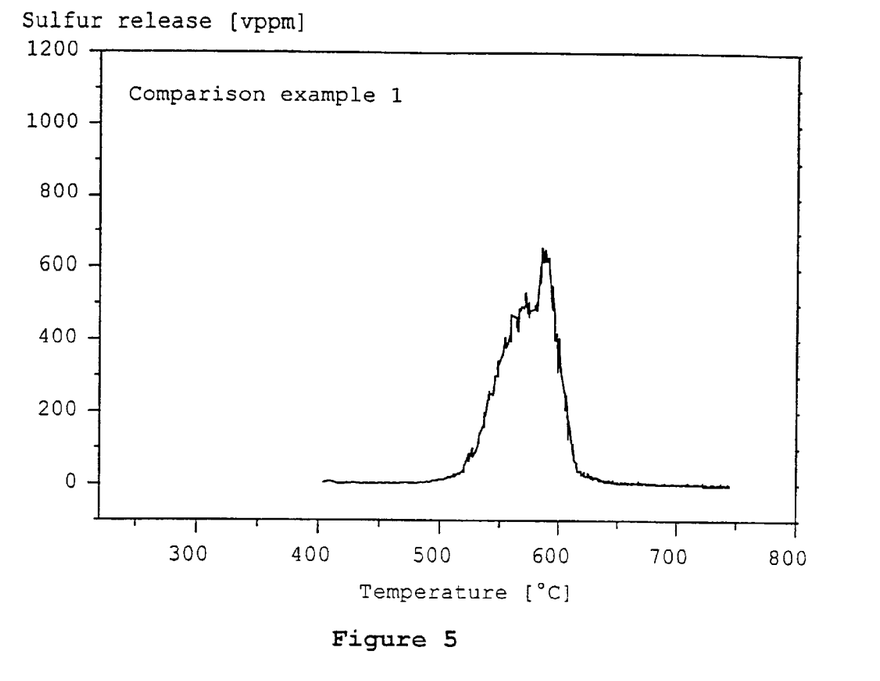
FIGS. 5–7 are plots of the desulfurization versus temperature of the sulfur traps of Comparative Examples 1 to 3.
Figure 6:
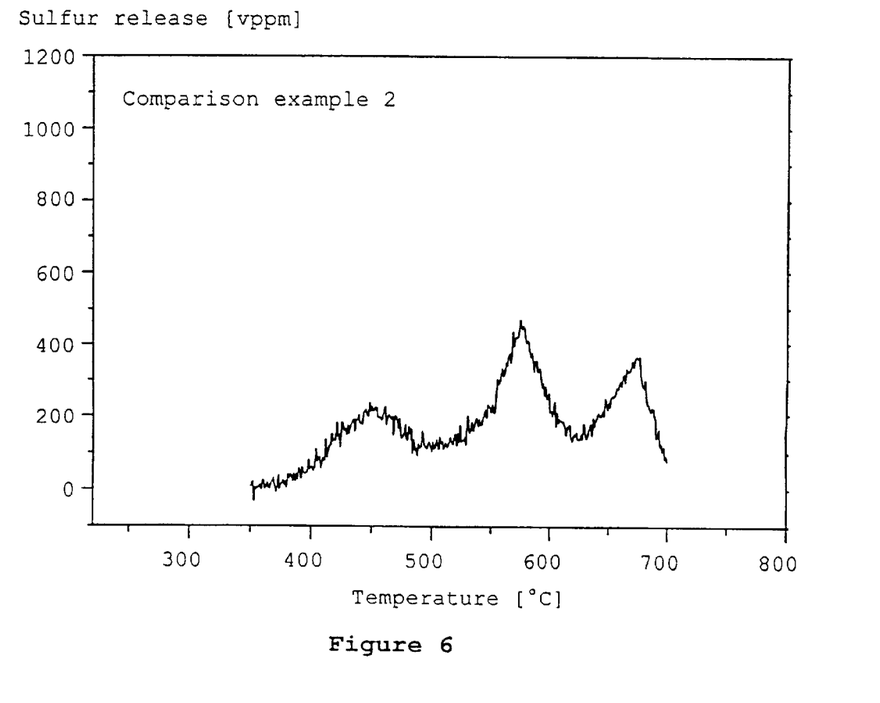
Figure 7:
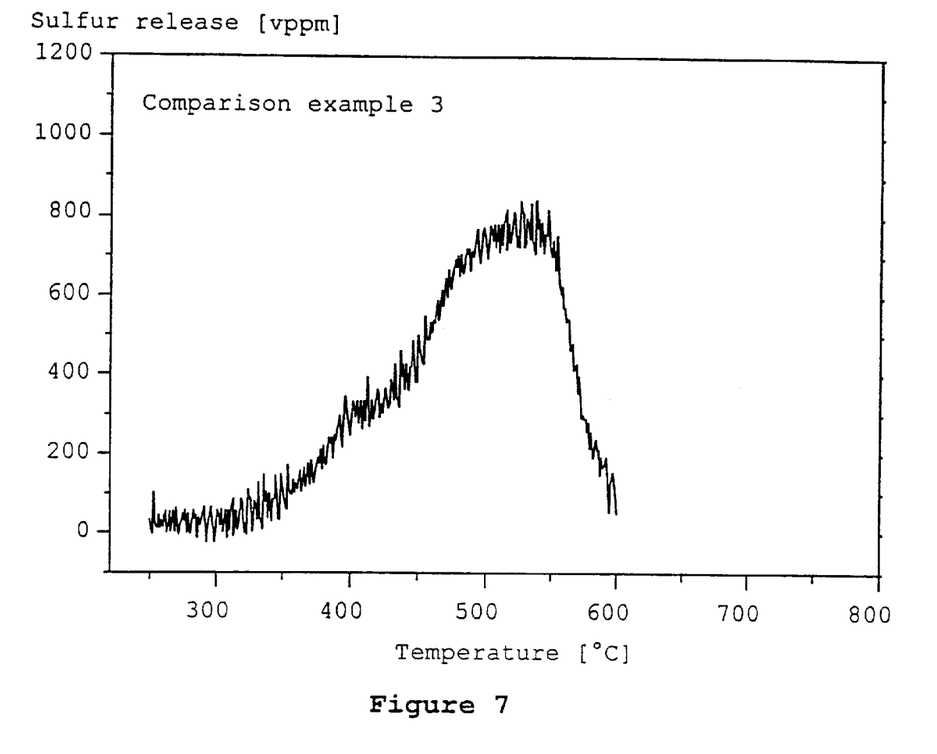
Figure 8:
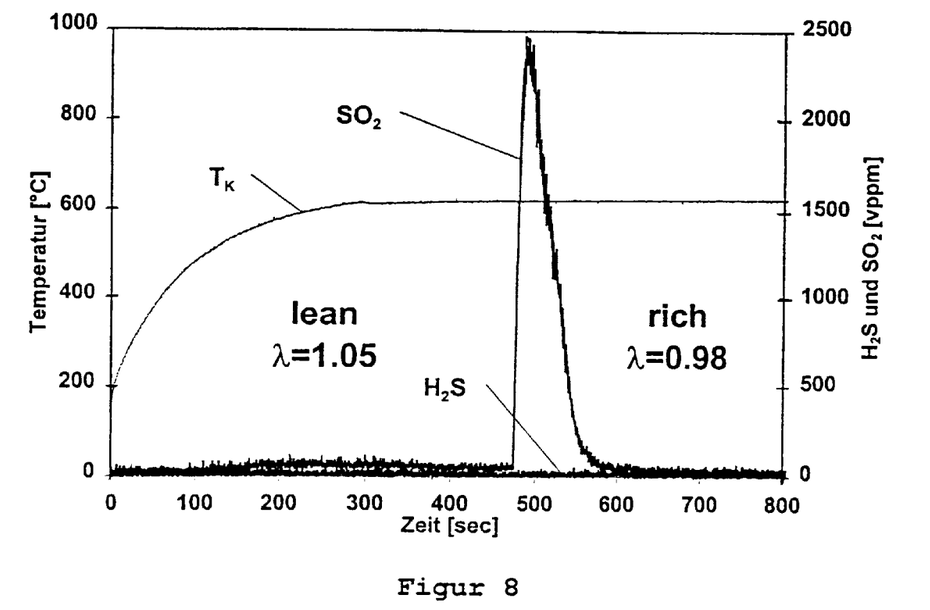
FIG. 8 is a plot of desulfurization behavior of a sulfur trap at 640° C. and reduction of the normalized air/fuel ratio to a value of 0.98.
Figure 9:
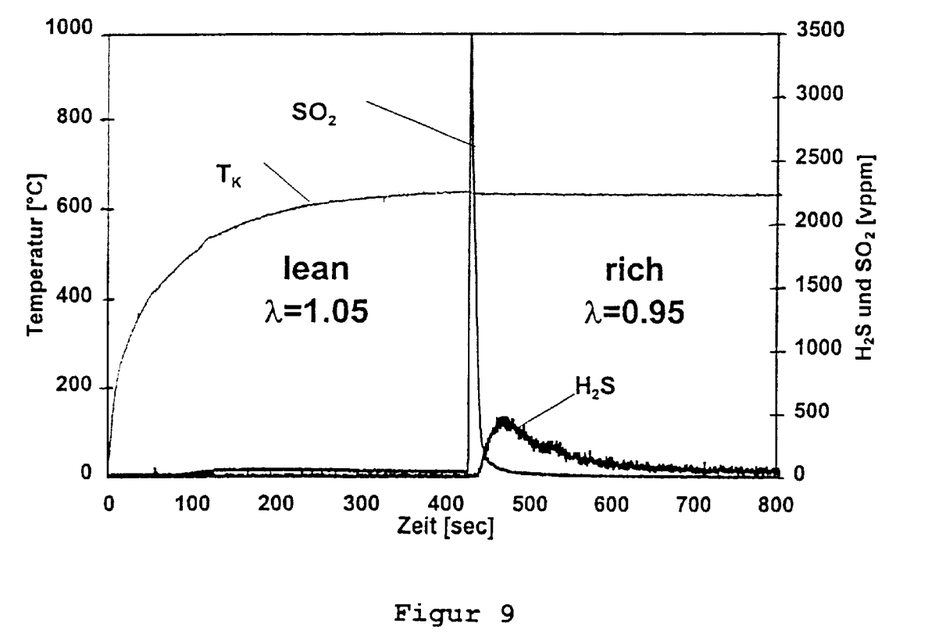
FIG. 9 is a plot of desulfurization behavior of a sulfur trap at 640° C. and reduction of the normalized air/fuel ratio to a value of 0.95.

To determine the time needed for the desulfurizing, a specimen of the sulfur traps of Example 1 was charged with sulfur as before at a lean-burning Otto engine at 400° C. for the duration of 5 hours using fuel with a sulfur content of 400 wt. ppm. The volume of the sulfur trap was 0.8 liters. The exhaust gas temperature was then heated at a normalized air/fuel ratio of 1.05 up to a temperature of 640° C. After reaching this temperature, the normalized air/fuel ratio was reduced to a value of 0.98 and in a second passage to a value of 0.95. Tile volume flow of the exhaust gas here was about 102000 Nl/h. The desulfurizing behavior is set out in FIGS. 8 and 9 as a function of time.

If the desulfurizing is carried out at a normalized air/fuel ratio of 0.95 (FIG. 9), the sulfur trap first releases a large proportion of the sulfates in the form of sulfur dioxide within a brief period of time. A substantial proportion of the stored sulfur is, however, emitted over a longer period of time in the form of hydrogen sulfide. This slow release of hydrogen sulfide is responsible for the fact that a relatively long period of time is needed for the desulfurizing.

In contrast, if the desulfurizing is carried out at a normalized air/fuel ratio of 0.98 (FIG. 8), the sulfur is exclusively released in the form of sulfur dioxide. While in this case the release of the sulfur dioxide takes longer than at λ=0.95, the absence of a release of hydrogen sulfide over an extended period of time does, however, mean that the duration of the desulfurizing in the case of λ=0.98 is markedly shorter overall.

Figure 10:
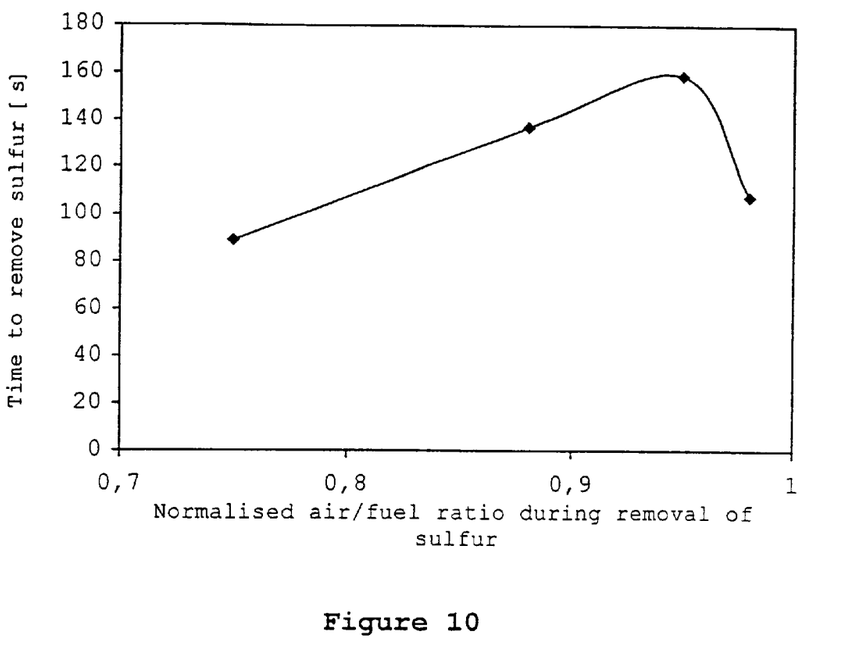
FIG. 10 is a plot of duration of the desulfurization as a function of the normalized air/fuel ratio.

FIG. 10 shows the duration of the desulfurizing at four different normalized air/fuel ratios. Whereas a normalized air/fuel ratio of 0.98 constitutes a favorable value in respect of the desulfurizing duration and the suppression of hydrogen sulfide, it is possible to further reduce the duration of the desulfurizing by greatly reducing the normalized air/fuel ratio. Thus, faster desulfurizing is achieved at a normalized air/fuel ratio of 0.75 than at a normalized air/fuel ratio of 0.98. However, in so doing the released sulfur is almost quantitatively converted into hydrogen sulfide and must in this case be re-oxidized to sulfur dioxide by means of separate measures.

Figure 11:
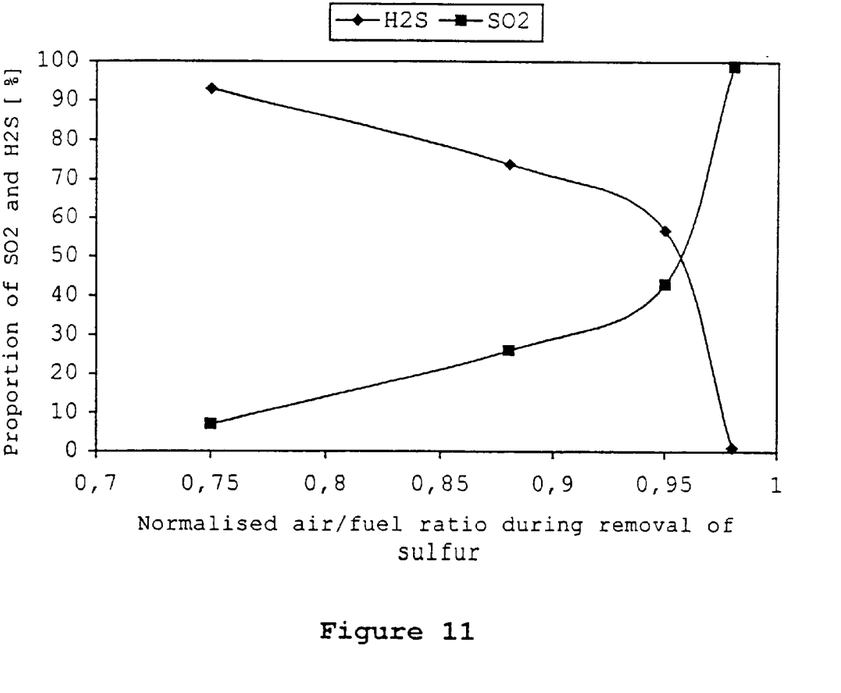
FIG. 11 is a plot of percentages of sulfur dioxide and hydrogen sulfide in the exhaust gas downstream of the sulfur trap at various normalized air/fuel ratios during desulfurization.

FIG. 11 shows the percentage ratio of hydrogen sulfide and sulfur dioxide in the exhaust gas downstream of the sulfur trap as a function of the normalized air/fuel ratios during the desulfurizing. These ratios depend (greatly on the volume of the sulfur trap used and thus on the residence time of the released sulfur dioxide in the sulfur trap. The longer the residence time in the region of the sulfur trap, the more hydrogen sulfide is formed.

Further variations and modifications will be apparent to those skilled in the art from the foregoing and are intended to be encompassed by the claims appended hereto.

German priority application 198 13 655.2 is relied on and incorporated herein by reference.

We claim:

1. A process for purifying exhaust gas from an internal-combustion engine comprising:

passing said exhaust gas in contact with a storage material for sulfur oxides, wherein the storage material includes a magnesium-aluminum spinel ($MgO.Al_2O_3$), wherein the storage material has a molar ratio of magnesium oxide to aluminum oxide of 2:1 to 10:1, and wherein the magnesium oxide present in stoichiometric excess is homogeneously dispersed in the storage material;

storing sulfur oxides contained in the exhaust gas on the storage material at a lean normalized air/fuel ratio; and after a storage capacity of the storage material has been exhausted, desulfurizing the storage material at a rich normalized air/fuel ratio and an exhaust gas temperature above 500° C.

2. The process according to claim 1, wherein the storage material further includes a doping agent, which is at least one of the alkaline earth metal oxides calcium oxide, strontium oxide, or barium oxide, in an amount of 1 to 40%, by weight, related to a total weight of the storage material.

3. The process according to claim 2, wherein the storage material has a specific surface area of 100 to 300 $m^2/g$.

4. The process according to claim 2, wherein the storage material further includes at least one rare earth oxide in an amount of 1 to 40% by weight, related to the total weight of the storage material.

5. The process according to claim 4, wherein the storage material displays a specific surface area of at least 20 $m^2/g$ after calcination at 1050° C. for 24 hours.

6. The process according to claim 4, wherein the storage material has a specific surface area of 100 to 300 $m^2/g$.

7. A process according to claim 6, wherein the storage material is deposited on a honeycomb monolithic carrier and the exhaust gas passes through channels provided in the honeycomb monolithic carrier.

8. The process according to claim 1, wherein the storage material further includes at least one of the platinum group metals platinum, palladium or rhodium, in an amount of 0.01 to 5% by weight, related to a total weight of the storage material.

9. A process according to claim 8, wherein the storage material is deposited on a honeycomb monolithic carrier and the exhaust gas passes through channels provided in the honeycomb monolithic carrier.

10. The process according to claim 1, wherein the storage material further includes at least one additional substance selected from the group consisting of a zeolite, titanium dioxide and aluminum oxide, in a weight ratio of the storage material to the additional substances of 1:5 to 20:1.

11. The process according to claim 1, wherein the storage material is prepared by calcining a magnesium/aluminum hydrotalcite with a molar ratio of magnesium oxide to aluminum oxide of 2:1 to 10:1 at a temperature of 400 to 600° C. for 1 to 10 hours.

12. The process according to claim 11, wherein preparation of the storage material further includes impregnating the storage material after calcination with at least one soluble precursor compound selected from the group consisting of calcium oxide, strontium oxide and barium oxide, and then recalcining.

13. The process according to claim 12, wherein preparation of the storage material further includes impregnating the storage material after calcination with a soluble precursor compound of at least one of the platinum group metals selected from the group consisting of platinum, palladium and rhodium.

14. The process according to claim 11, wherein preparation of the storage material further includes impregnating the storage material with at least one soluble precursor compound of the rare earth oxides and then recalcining.

15. The process according to claim 11, wherein preparation of the storage material further includes impregnating the storage material after calcination with at least one soluble precursor of the alkaline earth metal oxides calcium oxide, strontium oxide and barium oxide, with soluble precursors of at least one rare earth oxide and with a soluble precursor of at least one of the platinum group metals platinum, palladium and rhodium, and then recalcining.

16. The process according to claim 1, wherein said magnesium-aluminum spinel is prepared by calcination of a magnesium/aluminum hydrotalcite.

17. A process according to claim 1, wherein the storage material is deposited on a honeycomb monolithic carrier and the exhaust gas passes through channels provided in the honeycomb monolithic carrier.

* * * * *